United States Patent
Kominar

(10) Patent No.: US 10,445,519 B2
(45) Date of Patent: Oct. 15, 2019

(54) SYSTEM AND METHOD FOR DATA INPUT RESISTANT TO CAPTURE

(71) Applicant: BlackBerry Limited, Waterloo (CA)

(72) Inventor: Jeremy Lawson Kominar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 109 days.

(21) Appl. No.: 15/689,638

(22) Filed: Aug. 29, 2017

(65) Prior Publication Data

US 2019/0065767 A1 Feb. 28, 2019

(51) Int. Cl.
| | | |
|---|---|---|
| *G06F 21/00* | (2013.01) | |
| *G06F 21/62* | (2013.01) | |
| *G06F 3/0488* | (2013.01) | |
| *G06K 9/00* | (2006.01) | |
| *G06F 21/83* | (2013.01) | |
| *G06F 21/31* | (2013.01) | |
| *G06F 21/84* | (2013.01) | |
| *G06F 3/16* | (2006.01) | |
| *G06F 3/00* | (2006.01) | |

(52) U.S. Cl.
CPC ...... *G06F 21/6218* (2013.01); *G06F 3/04886* (2013.01); *G06F 21/31* (2013.01); *G06F 21/83* (2013.01); *G06K 9/0002* (2013.01); *G06F 3/002* (2013.01); *G06F 3/16* (2013.01); *G06F 21/84* (2013.01); *G06F 2221/2123* (2013.01)

(58) Field of Classification Search
CPC .. G06F 21/6218; G06F 3/04886; G06F 21/31; G06F 3/002; G06F 3/16; G06F 21/83; G06F 21/84; G06F 2221/2123; G06K 9/0002

See application file for complete search history.

(56) References Cited

U.S. PATENT DOCUMENTS

| | | | |
|---|---|---|---|
| 5,951,710 A | * | 9/1999 | Kihara ............... G11B 20/1813 714/766 |
| 7,444,517 B2 | | 10/2008 | Dayan et al. |
| 7,451,322 B2 | | 11/2008 | Lee |
| 7,653,818 B2 | | 1/2010 | Serpa |

(Continued)

FOREIGN PATENT DOCUMENTS

EP 2793156 10/2014

OTHER PUBLICATIONS

EESR dated Jan. 18, 2019, EP Application No. 18188746.4.

*Primary Examiner* — Ghodrat Jamshidi
(74) *Attorney, Agent, or Firm* — Rowand LLP

(57) ABSTRACT

A computer-implemented method of confidential data input resilient against data capture includes receiving input concurrently from first and second input devices. The input from the first input device corresponds to characters. An input mode indication is determined based on the input received at the second input device and indicates at least a first character of the plurality of characters being input in a first input mode and at least a second character of the plurality of characters being input in a second input mode. An input string is formed by extracting the at least a first character input in the first input mode. An action is initiated based on the input string. The first input device may be a keyboard. The second input device may be a sensor such as a portion of a touchscreen or a fingerprint sensor. Related systems and computer-readable media are also disclosed.

20 Claims, 9 Drawing Sheets

(56) References Cited

U.S. PATENT DOCUMENTS

| | | | |
|---|---|---|---|
| 7,735,124 B2 | 6/2010 | Lin et al. | |
| 8,306,137 B2* | 11/2012 | Atungsiri | H04L 1/0071 |
| | | | 375/260 |
| 9,147,056 B2 | 9/2015 | Limberg | |
| 9,489,663 B2 | 11/2016 | Schuette | |
| 2003/0158815 A1* | 8/2003 | Yoshida | G06F 21/31 |
| | | | 705/50 |
| 2008/0229230 A1* | 9/2008 | Grigoriev | G06F 21/82 |
| | | | 715/780 |
| 2009/0322692 A1* | 12/2009 | Kim | G06F 3/0236 |
| | | | 345/173 |
| 2010/0058479 A1 | 3/2010 | Chen | |
| 2011/0055585 A1* | 3/2011 | Lee | H04L 9/0844 |
| | | | 713/183 |
| 2011/0078788 A1 | 3/2011 | Takimoto | |
| 2011/0145905 A1* | 6/2011 | Cho | G06F 21/6218 |
| | | | 726/7 |
| 2011/0175820 A1* | 7/2011 | Toba | G06F 3/0236 |
| | | | 345/169 |
| 2012/0212420 A1* | 8/2012 | Shin | G06F 3/04883 |
| | | | 345/173 |
| 2014/0146054 A1* | 5/2014 | Luan | G06F 21/31 |
| | | | 345/467 |
| 2016/0093131 A1 | 3/2016 | Schuette | |
| 2016/0162900 A1* | 6/2016 | Dutt | G06Q 20/4016 |
| | | | 705/44 |
| 2017/0124311 A1* | 5/2017 | Li | H04L 29/06 |
| 2018/0336339 A1* | 11/2018 | Wang | G06F 21/46 |

* cited by examiner

SYSTEM AND METHOD FOR DATA INPUT RESISTANT TO CAPTURE

TECHNICAL FIELD

The present disclosure relates to computer systems, and, more particularly, to protecting data against capture by attackers.

BACKGROUND

Users often need to enter data into electronic devices. Users may wish to protect some or all of that data, such as, for example, confidential data, against capture by an onlooker. For example, a user may need to enter passwords to authenticate or to unlock a computer system.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
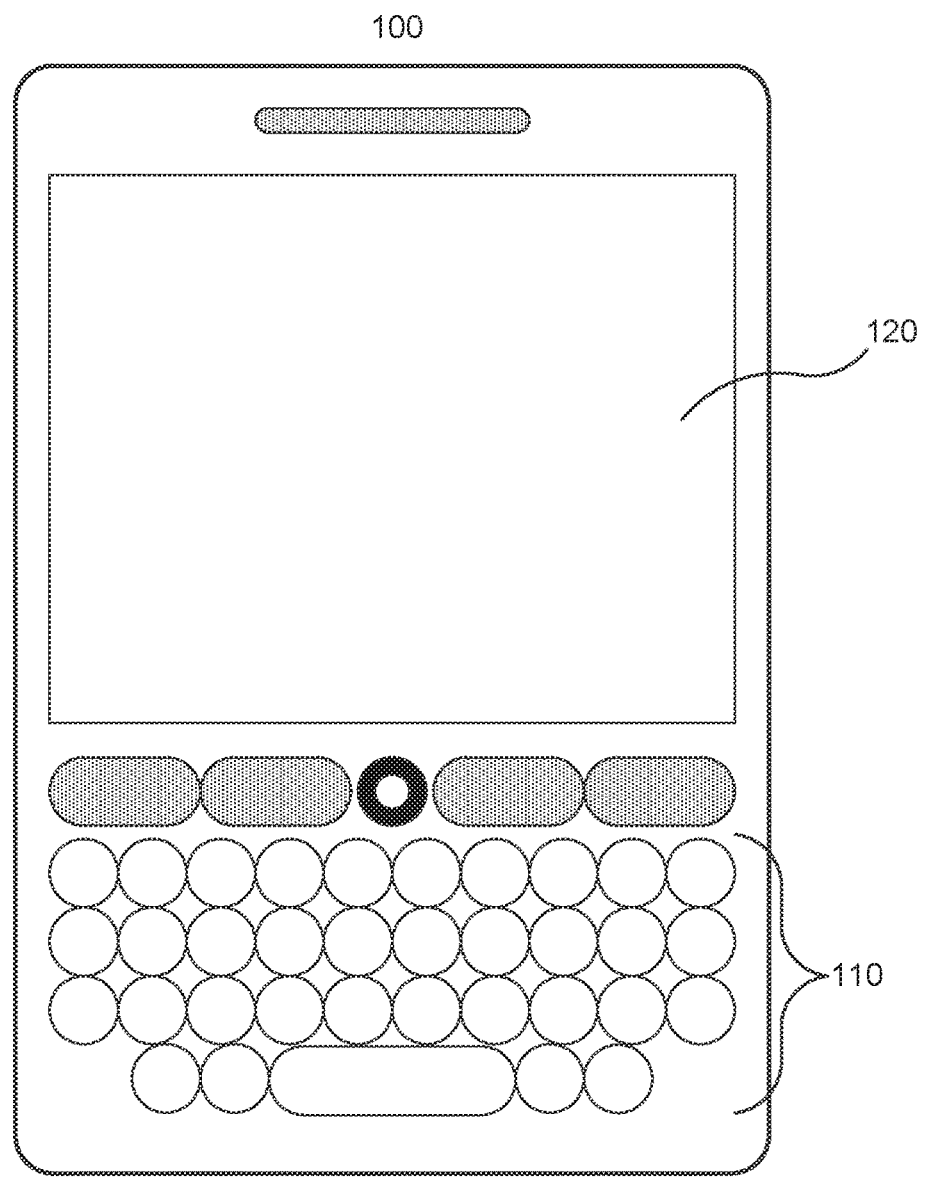
FIG. 1 illustrates an electronic device, of an example embodiment.

Data may be vulnerable to capture by an onlooker during input into an electronic device. For example, in a so-called "shoulder surfing" attack, an observer may watch a user type in confidential data such as, for example, a personal identification number (PIN) so that the observer can learn the confidential data. For example, the observer may want to learn a user's PIN so that they may later use it to compromise their financial accounts.

Additionally or alternatively, attackers may utilize video cameras in an effort to compromise data input. Other forms of surveillance may also be employed by attackers. For example, where the input is provided by way of voice input, an attacker may attempt to overhear input such as by using hidden microphones or "bugs".

Attackers may also attempt to compromise the input data stream in other manners than observing the input. For example, the device itself may be compromised or may be modified. For example, keylogging malware may be employed in an effort to capture input data streams. In another example, keylogging hardware may be used to try to compromise data input to an electronic device.

In one aspect, there is provided a computer system comprising: a processor; a first input device coupled to the processor; a second input device coupled to the processor; and a computer-readable storage medium storing instructions that when executed by the processor adapt the computer system to: receive, from the first input device, input corresponding to a plurality of characters and concurrently receive input from the second input device; determine an input mode indication based on the input received at the second input device, the indication indicating at least a first character of the plurality of characters being input in a first input mode and at least a second character of the plurality of characters being input in a second input mode; form an input string by extracting the at least a first character input in the first input mode; and initiate an action based on the input string.

In another aspect, there is provided a computer-implemented method comprising: receiving, from a first input device, input corresponding to a plurality of characters and concurrently receiving input from a second input device; determining an input mode indication based on the input received at the second input device, the indication indicating at least a first character of the plurality of characters being input in a first input mode and at least a second character of the plurality of characters being input in a second input mode; forming an input string by extracting the at least a first character input in the first input mode; and initiating an action based on the input string.

In another aspect, there is provided a non-transitory computer-readable storage medium storing instructions that when executed by a processor of a computer system adapt the computer system to: receive, from a first input device, input corresponding to a plurality of characters and concurrently receive input from a second input device; determine an input mode indication based on the input received at the second input device, the indication indicating at least a first character of the plurality of characters being input in a first input mode and at least a second character of the plurality of characters being input in a second input mode; form an input string by extracting the at least a first character input in the first input mode; and initiate an action based on the input string.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In one aspect, the present disclosure provides a solution in which data input is made resistant to data capture by an observer through receiving a plurality of characters, only some of which are actual characters and the others of which are dummy characters that the computing device may ignore. Additional input beyond the characters signals whether particular ones of the input characters are actual characters or dummy characters.

The additional characters received together with the actual characters of an input string may act to obscure the actual characters of the input string. Conveniently, in this way, the ability of an observer to capture the input string may be limited.

The signal allowing the computer system may distinguish between actual and dummy characters may take a variety of forms. In one example, the processor may concurrently receive the plurality of characters via a first input device and a signal indicating which class of characters are being input at a particular time via a second input device. In another example, the processor may receive an indication of the pressure used to enter an individual key that can be used to distinguish between actual and dummy input characters.

FIG. 1 shows one example embodiment of an electronic device 100.

As illustrated, the electronic device 100 may include a keyboard 110 and a display screen 120.

The electronic device 100 may comprise a computer system. As illustrated, the electronic device 100 may comprise a mobile device such as, a smartphone or a tablet. In another example, the electronic device 100 can comprise an endpoint including one or more of any of the following: mobile devices (e.g., smartphones, tablets, laptops, wearables, gaming devices, navigation devices, cameras, etc.), computers (e.g., laptops, desktops, etc.), IoT (Internet of Things) devices (e.g., vehicles, appliances, smart devices, connected devices, buildings including homes, etc.), EoT (Enterprise of Things) devices (i.e., IoT devices in an enterprise) and any other nodes or combination thereof. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. In another example, the electronic device 100 may also be another sort of computer system such as, for example, a kiosk with an integrated keyboard.

The keyboard 110 allows a user to provide character input. Keys of the keyboard 110 may correspond to characters such as, for example, where the keyboard 110 comprises a QWERTY keyboard or a numeric keypad. In another example, keys of the keyboard 110 may be used in sequence or in tandem for input of various characters such, for example, for Chinese, Japanese, or Korean language input.

The keyboard 110 may comprise a mechanical keyboard. For example, the keyboard 110 may employ one or more switches, a membrane, or a combination thereof.

The display screen 120 allows display of output to a user. For example, the display screen 120 may be a liquid crystal display or an electronic ink/e-paper display.

The display screen 120 may comprise a touchscreen allowing touch input to be received from a user. For example, the display screen 120 may integrate a resistive or a capacitive touch sensor or be coupled to same.

As will become apparent, the electronic device 100 includes software that allows it to receive input data in manners that may limit the ability of an onlooker to determine the data.

Figure 2:
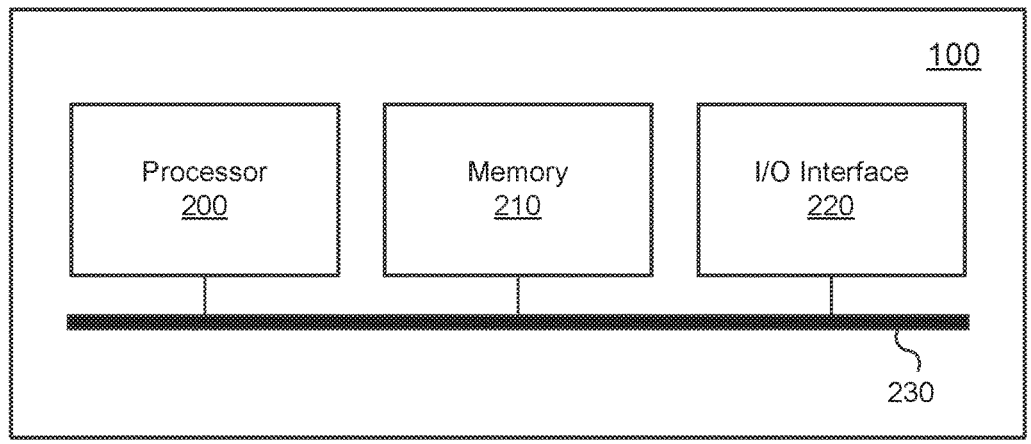
FIG. 2 shows a simplified high-level block diagram of the electronic device of FIG. 1.

FIG. 2 shows a simplified high-level block diagram of an example of the electronic device 100.

As illustrated, the electronic device 100 includes a processor 200, a memory 210, and an input/output (I/O) interface 220. The foregoing modules of the electronic device 100 are in communication over a bus 230.

The processor 200 comprises a hardware processor and may, for example, comprise one or more processors using ARM, x86, MIPS, or PowerPC™ instruction sets. For example, the processor 200 may comprise Intel™ Core™ processors, Qualcomm™ Snapdragon™ processors, or the like.

The memory 210 may include random access memory, read-only memory, persistent storage such as, for example, flash memory, a solid-state drive or the like. Read-only memory and persistent storage are a computer-readable medium. A computer-readable medium may be organized using a file system such as may be administered by an operating system governing overall operation of the electronic device 100.

The I/O interface 220 allows the electronic device 100 to receive input and provide output. For example, the I/O interface 220 may allow the electronic device 100 to receive input from or provide output to a user. In another example, the I/O interface 220 may allow the electronic device 100 to communicate with a computer network.

The I/O interface 220 may serve to interconnect the electronic device 100 with one or more I/O devices such as, for example, the keyboard 110 or the display screen 120. In a further example, the I/O interface 220 may additionally interconnect the electronic device 100 with one or more additional I/O devices such as for example, a pointing device like a mouse or a trackball, a fingerprint reader, a communications module or the like.

Software comprising instructions is executed by the processor 200 from a computer-readable medium. For example, software may be loaded into random-access memory from persistent storage or flash memory of the memory 210. Additionally or alternatively, software may be executed by the processor 200 directly from read-only memory of the memory 210.

In another example, software may be accessed via the I/O interface 220.

Figure 3:
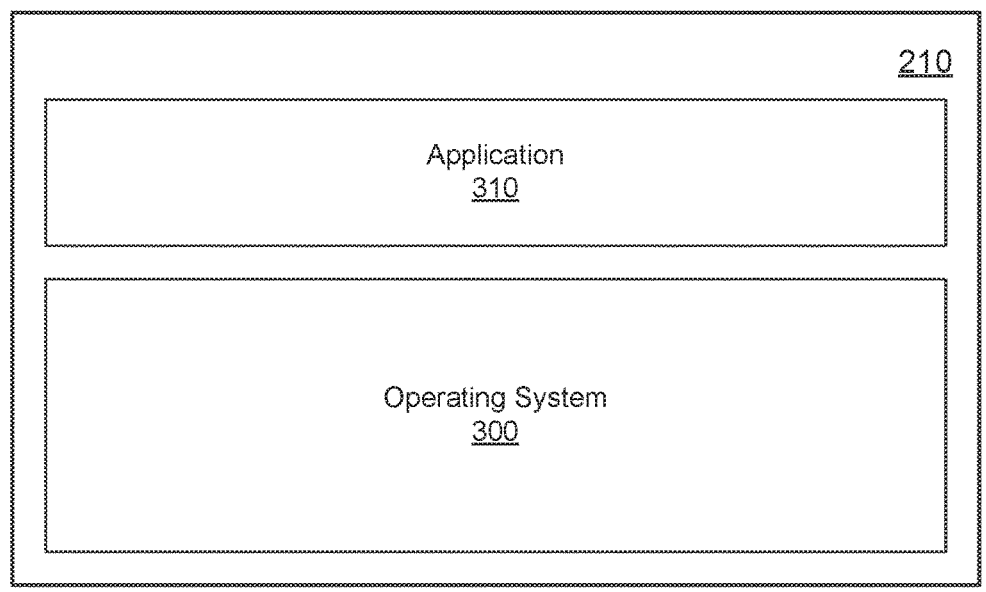
FIG. 3 depicts a simplified software organization of the electronic device of FIG. 1.

FIG. 3 depicts a simplified organization of software components stored in the memory 210 of the electronic device 100. As illustrated these software components include an operating system 300 and an application 310.

The operating system 300 comprises software and may comprise, for example, software such as, for example, Android™, QNX™, Linux™, Apple™ iOS™, Microsoft™ Windows™, or the like. The operating system 300 controls the overall operation of the electronic device 100 and allows the application 310 to access the processor 200, the memory 210, and the I/O interface 220.

The application 310, comprises software that, in combination with the operating system 300, adapts the electronic device 100 to operate as a device for various purposes.

One or both of the operating system 300 or the application 310 may provide functionality allowing a user to input data. Users may be desirous of preventing or limiting the ability of observers to determine input data. For example, input data may be confidential. In another example, a user may be performing input in a public place and may simply prefer to preserve the privacy of his or her data generally. As will become apparent, one or both of the operating system 300 and the application 310 may provide input functionality allowing input data to be received in manners that may limit the ability of an attacker to determine input data.

Figure 4:
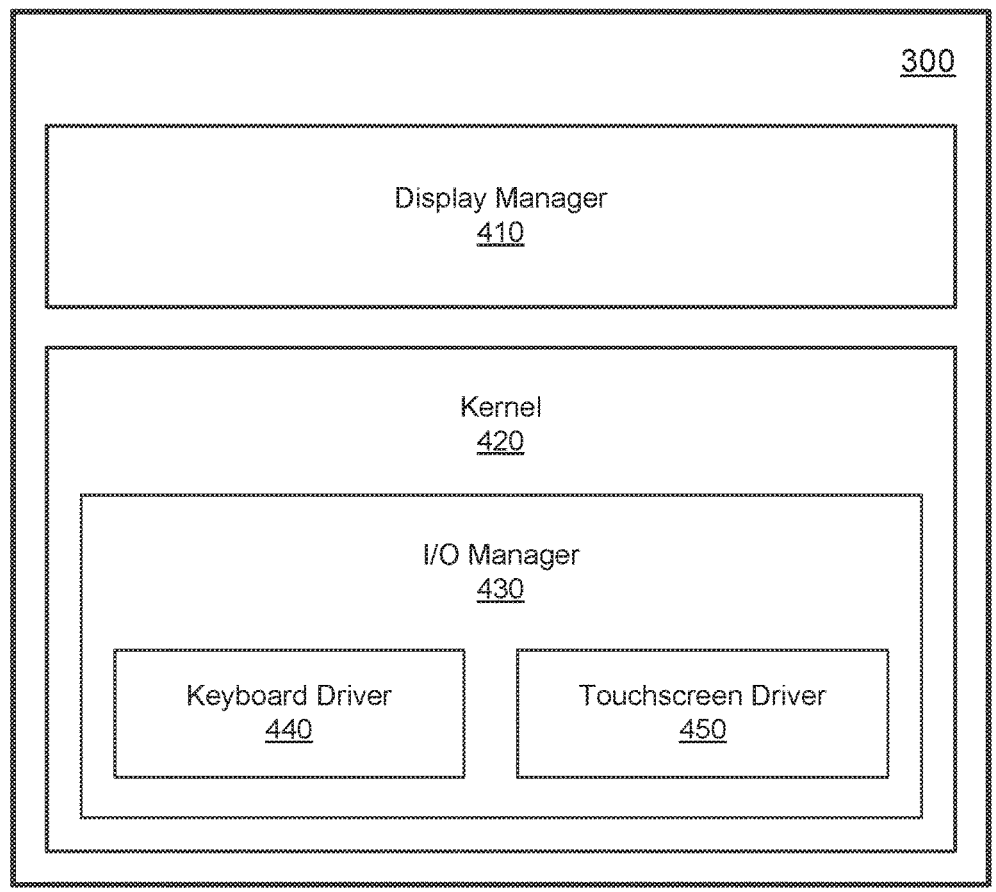
FIG. 4 depicts software modules of an example embodiment of an operating system for the electronic device of FIG. 1.

FIG. 4 depicts software modules of an example embodiment of the operating system 300.

As illustrated, the operating system 300 includes a display manager 410 and a kernel 420.

The display manager 410 provides for presenting output such as for example, user interface displays, to a user. For example, the display manager 410 may present output via the display screen 120 (FIG. 1).

The kernel 420 is responsible for core functions of the operating system 300 including, for example, allocation and access control for the memory 210 (FIG. 2), and scheduling the execution of threads or processes on the processor 200 (FIG. 2). The kernel 420 may also provide for access to various devices such as, for example, via the I/O interface 220 (FIG. 2).

As illustrated, the kernel 420 includes a subcomponent, the I/O manager 430, for providing access to one or more input/output (I/O) devices such as, for example, by way of the I/O interface 220.

The I/O manager 430 may include various driver subcomponents for interacting with one or more I/O devices. As illustrated, the I/O manager 430 may include a keyboard driver 440 and a touchscreen driver 450.

The keyboard driver 440 allows receiving input from a keyboard device such as, for example, the keyboard 110 (FIG. 1). The keyboard driver 440 may provide the operating system 300 with character input based directly on characters received from a keyboard device. Additionally or alternatively, the keyboard driver 440 may receive input from a keyboard device that, in tandem with additional software, yields character input. For example, the keyboard driver 440 may be coupled to input method editor (IME) software to allow the entry of characters of one or more foreign languages.

The touchscreen driver 450 may interact with a touchscreen device such as, for example, the display screen 120 (FIG. 1) to provide display output or to receive touch input. The touchscreen driver 450 may work in tandem with the display manager 410 via the I/O manager 430 to provide display output on a display device.

As discussed, one or both of the operating system 300 and the application 310 may, alone or in combination with the other, provide functionality allowing a user to input data in manners as may limit the ability of an onlooker to determine the data.

Figure 5:
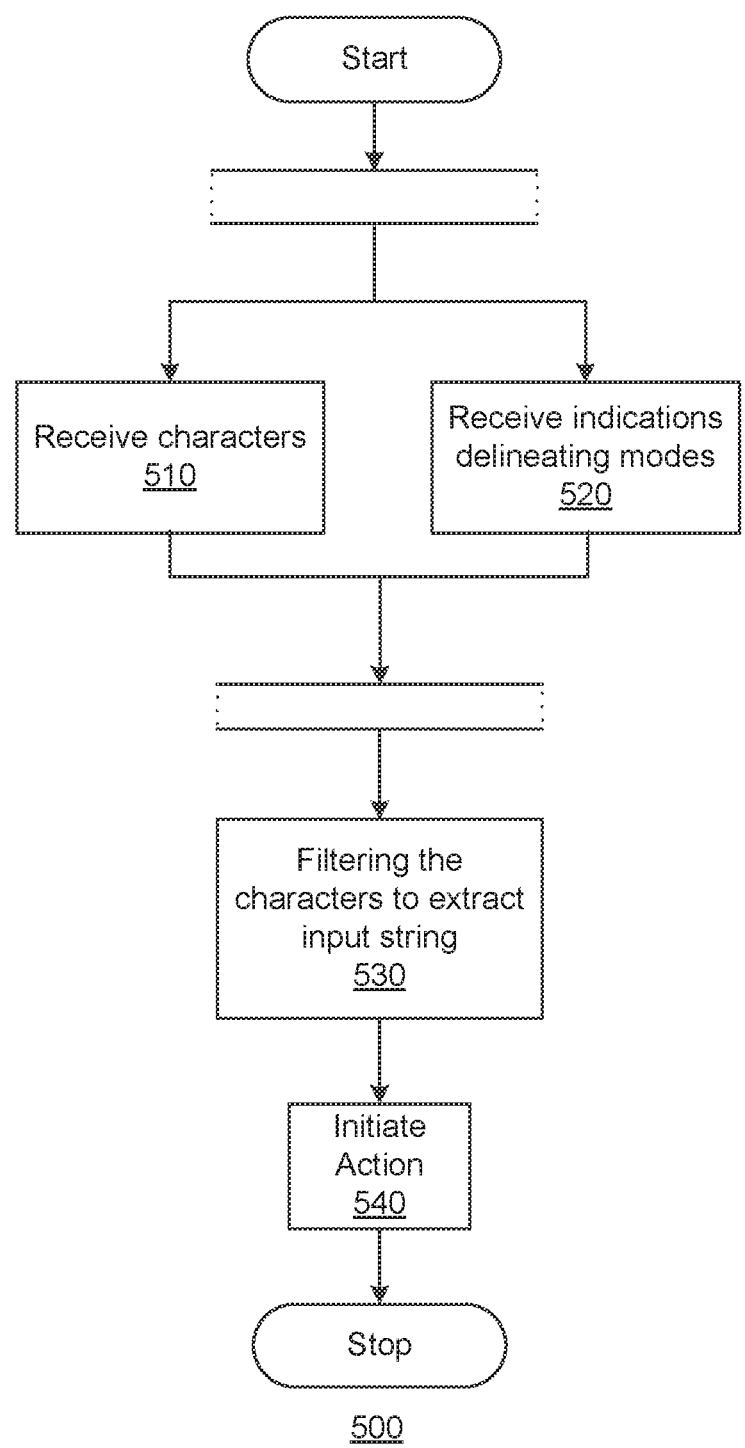
FIG. 5 shows a flow chart illustrating an example method for receiving an input string of characters.

FIG. 5 shows a flow chart illustrating an example method 500 for receiving an input string of characters. The method may be performed by the processor 200 executing various instructions of one or both of the operating system 300 and the application 310 at the electronic device 100.

At an operation 510 characters are received from a first input device. For example, character input may be received from the keyboard 110 such as, for example, by way of the I/O manager 430 and/or the keyboard driver 440.

Indications differentiating modes may be received concurrently from a second input device at an operation 520. More particularly, two modes, may be distinguished by the indications and may, in turn, distinguish ones of the characters input in the first mode from any characters input in the second mode. Conveniently, in this way, the electronic device 100 may differentiate input characters from actual characters. For example, characters received at the operation 510 in a first mode may be considered as forming a portion of an input string, while characters received while in a second mode may be considered additional or dummy characters.

Modes may be signaled in a variety of manners. In one example, modes may be signalled via a touchscreen such as, for example, the display screen 120. For example, a user may toggle between modes by tapping the display screen 120 or a designed portion thereof. In another example, a first mode may be indicated by not touching the display screen 120 or by not touching a designated portion thereof and the second mode indicated by touching the display screen 120 or a designated portion thereof. In yet another example, a first mode may be signalled by touching a first area of the display screen 120 and the second mode signalled by touching another area of the display screen 120.

As indicated in FIG. 5, the operations 510 and 520 may be performed concurrently—i.e. in tandem. Put differently, electronic device 100 may receive, from a first input device, input corresponding to a plurality of characters and concurrently receive input from a second input device. Electronic device 100 may then determine an input mode indication based on the input received at the second input device, the indication indicating at least a first character of the plurality of characters being input in a first input mode and at least a second character of the plurality of characters being input in a second input mode. As such, character input and mode input may be received concurrently at the operations 510 and 520, respectively, with the mode input signalling whether particular characters should be considered to form a portion of the input string or, instead, as additional characters. In other words, the modes may allow differentiation between characters of an input string and additional or dummy characters intended to obscure the entry of the input string.

Figure 6:
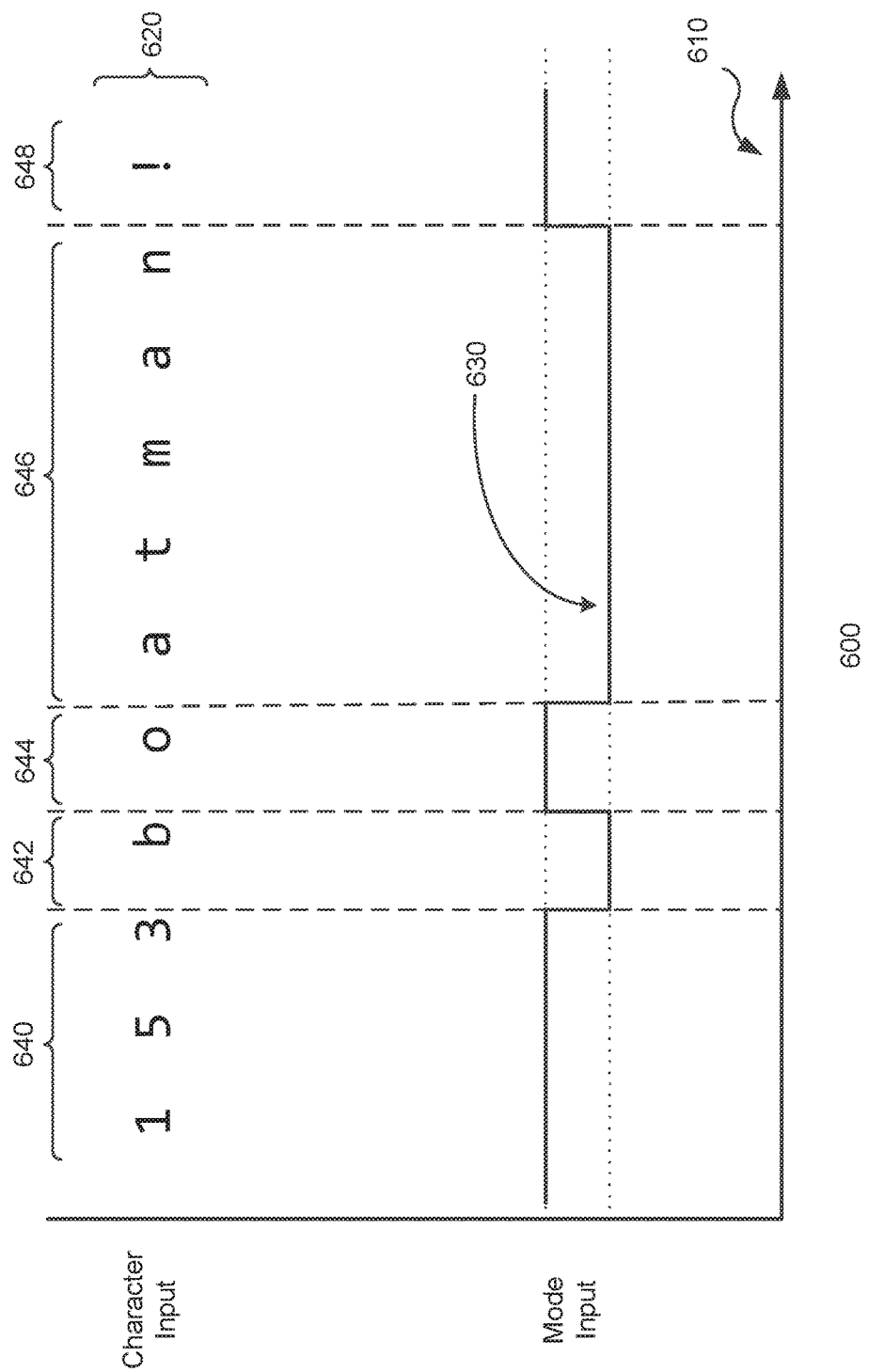
FIG. 6 shows a signal diagram depicting example input as may be processed according to the method of FIG. 5.

FIG. 6 provides a signal diagram 600 depicting one example of character and mode input.

The signal diagram 600 shows two series, a character input 620 and a mode input 630, received over time at the operations 510 and 520, respectively, with time increasing left-to-right along a time axis 610.

In the example, the confidential input string is "batman". The confidential string may, for example, be a password.

As explained above, the mode input 630 differentiates or distinguishes between a first and second mode. In FIG. 6, the first mode is indicated by a low value of the mode input 630 and the second mode is indicated by a high value of the mode input 630.

In some embodiments, low and high values of the mode input 630 may correspond directly to signals indicating particular actions by a user. For example, the value may be the value (or the inverse of the value) of a sensor. Put differently, the mode input 630 may be determined based on whether contact with the sensor is detected, with one of the first and second modes of mode input 630 corresponding to a detection of contact with the sensor and the other of the first and second input modes corresponding to a detection of non-contact with the sensor. In a specific example, the value may correspond to whether or not the display screen 120 is detecting a touch or is detecting a touch in a particular region thereof. In another example, the mode input 630 may correspond to the output of some processing of received input such as, for example, when the mode is toggled based on an intermittent input such as, for example, in embodiments where the user may tap the screen to switch modes as discussed above.

Returning to FIG. 5, following receipt of character and mode input at the operations 510 and 520, control flow proceeds to an operation 530.

In some embodiments, control flow may proceed to the operation 530 triggered by receipt of a sentinel input. For example, a particular character or character sequence such as, for example, a carriage return—e.g. corresponding to an enter or return key—may be received at the operation 510 and may trigger control flow proceeding to the operation 530.

In another example, control flow may proceed to the operation 530 based on some other input such, as for example, where the processor 200 receives a signal indicating that a particular indication displayed via the display screen 120 has been touched.

In other examples, control flow transfer may be initiated in other manners than receipt of particular input. For example, control flow could be transferred based on a fixed period of time elapsing or a defined number of input characters being received.

At the operation 530 the input is filtered to extract the input string. In particular, the character input is filtered to extract characters that were input during the first input mode, with those characters forming the input string. Put differently, the electronic device 100 may form an input string by extracting the at least a first character input in the first input mode.

This filtering may be better understood with reference to the example depicted in FIG. 6.

Returning to FIG. 6, the values of the mode input 630 and, in particular, the transitions between the two values thereof, may, conceptually, be understood as dividing the character input 620 into various periods.

For example, as illustrated, character input may be divided into periods 640, 642, 644, 646 and 648. Notably, characters input during the periods 642 and 646 are received while in the first mode and thus may be considered actual characters forming part of the input string. By contrast, characters input during the periods 640, 644 and 648 are input while in the second mode and thus may be considered additional or dummy characters.

Put differently, the filtering involves extraction from the character input 620 of those characters input while the mode input 630 signals the first mode (e.g. by a low value).

Notably, an attacker would need to observe both the character input 620 and the mode input 630 (and be able to correlate their observations of each) in order to easily extract the input string.

For example, an attacker that only observes the keyboard 110 may be frustrated in efforts to determine the input string. In another example, an attacker that only observes the display screen 120 may only be able to recreate the mode input 630 and may thus would have no or limited ability to determine the input string.

Conveniently, an attacker that compromises the electronic device 100 may be similarly frustrated. For example, if input on the keyboard 110 is logged by an attacker such as, for example, by way of keylogging malware, then that attacker may still be frustrated in determining the input string absent a corresponding, temporally correlated trace of mode input.

Returning again to FIG. 5, following extraction of the input string at the operation 530, control flow proceeds to an operation 540.

At the operation 540, an action may be initiated by the processor 200 based on the input string.

As an example, where the input string corresponds to a password for a remote system, the processor 200 may initiate signalling, such as, for example via a networking device accessed via the I/O interface 220 (FIG. 2), to authenticate using that password with the remote system so that data may be loaded from that system. For example, once authenticated to a remote web site, one or more pages may be retrieved from that site.

In another example, where the input string corresponds to a credit card, the action initiated may be the initiation of a purchase.

In some embodiments, the action may correspond to a particular application to which the input string is provided. For example, the method 500 or a variation thereof may be performed in association with an email application. In a specific example, the method 500 or a variation thereof may be performed in association with an email application to allow a user to enter their password and/or other credentials. In some such embodiments, the action may be accessing the user's email on or downloading the user's email from an email server including authenticating with the email server using the entered credentials.

In another example, the method 500 or a variation thereof may be performed in association with a messaging application. For example, it may be that the messaging application incorporates a mode in which the method 500 or a variation thereof is employed to allow a user to confidentially enter one or more messages or portions thereof. Such a mode may be employed to allow a user to enter confidential data in a secure fashion. In a specific example, a user could employ such a mode to send sensitive information such as, for example, a Wi-Fi™ password to a contact. In such embodiments, the action may be the addition of the entered text to a draft message. Additionally or alternatively, the action may be the transmission of a message including the entered text. In some such embodiments, display of a message (or portions thereof) entered in such a mode may be suppressed during entry. Additionally or alternatively, messages or portions of messages entered in such a mode may be suppressed in displays of previous messages or conversations. Additionally or alternatively, masked input indications may be provided for input entered in such a mode, during entry and/or in displays of previous message or conversations. Such masked input indications may be provided in manners further described below. Additionally or alternatively, input entered in such a mode may be omitted from or redacted in a messaging history or log. For example, such input may be masked in a stored messaging history or log.

In some embodiments, one or more operations of FIG. 5 may be varied.

In one example, following the operation 530, the processor 200 may perform processing to validate the input.

Validation may include some manner of determining whether the input string matches a known string. For example, where the input string purports to be a password, the input string may be compared to a saved password in manners known to skilled persons. For example, the input string may be hashed and compared to a stored password hash. In another example, the input string may be validated by forwarding it to a web service for comparison. In yet another example, the input string may be compared against a reference string to determine whether there is some manner of match. For example, the processor may compare the input string and the reference string to check if there is an exact match or, alternatively, a case-insensitive match. In yet another example, where the input string purports to a personal identification number for a smartcard, the input may be validated by using it to unlock the smartcard or to access data stored in the smartcard.

Conveniently, because the mode input signals those characters of the character input that form the input string, only the string formed by those characters may need to be considered in the matching. In other words, it may be necessary to perform only a single comparison. This may, be particularly convenient where the comparison operation is computationally expensive such as for example, in some password hashing schemes.

In another example of validation, the input string may be checked algorithmically rather than by way of comparison. For example, if the input string is supposed to be a credit card number, it may be validated by applying a Luhn check algorithm.

Where validation of an input string is performed, control flow may only proceed to the operation 540 following the validation conditional on the validation having been successful. In such embodiments, if there is no match, then control flow may terminate ("stop").

Conveniently, in this way the action initiated at the operation 540 may be conditioned on successful validation of the input string. For example, where the input string corresponds to a password, the processor 200 may cause the electronic device 100 or a portion thereof to be unlocked only if the password is correct.

As will be apparent to skilled person, the present technique does not require the use of keyboard and touchscreen devices. For example, other means of signalling either the character or mode input may be utilized.

In one example, a device may incorporate a front-facing camera that could be used for mode input. For example, the camera may be used to detect a particular action or movement of a user corresponding to a particular mode or a transition between modes. For example, processing of camera images by the processor 200 may detect a particular user movement—e.g. a double blink, a wink or a nod—indicating a particular mode or a transition between modes.

Figure 7A:
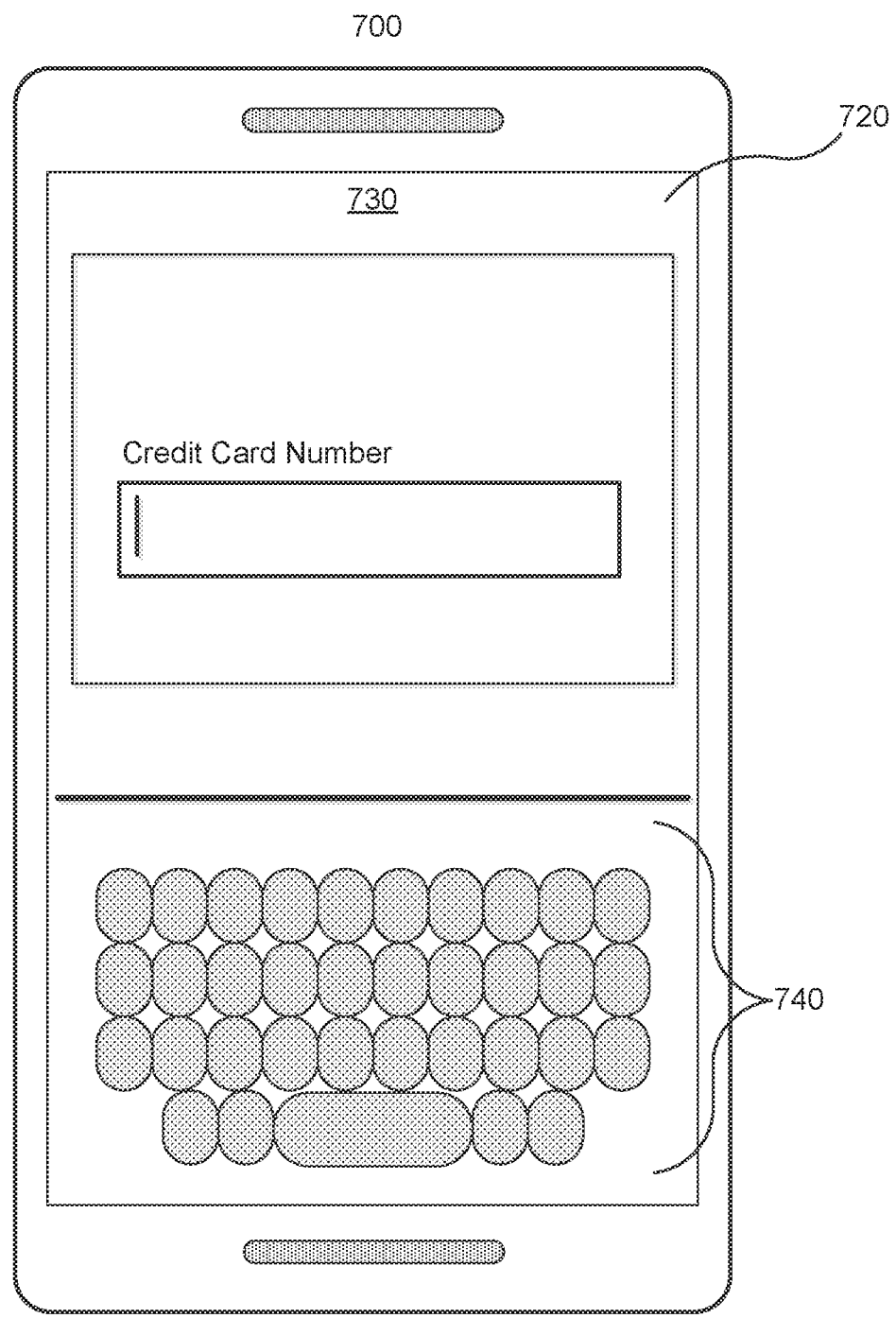
FIG. 7A shows a view of a front portion of a further electronic device, of another example embodiment.

In another example, the first and second input devices may be one and the same. For example, FIG. 7A illustrates an electronic device 700 that does not incorporate a physical keyboard. As an alternative, a virtual keyboard 740 may be employed for character input.

As illustrated, for example, a touchscreen 720 may provide a screen display 730 including user interface of both an application and of the virtual keyboard 740. The virtual keyboard 740 may be employed for data entry such as, for example, to the application.

Notably, the touchscreen 720 may support detecting the positions of touches thereof at multiple locations concurrently. For example, the touchscreen 720 may incorporate a capacitive touch sensor that can detect concurrently touches at multiple locations up to a predetermined maximum number of concurrently touch locations. Conveniently, such a touchscreen may be used as both a first and second input device. In particular, touches of the virtual keyboard 740 may be used for receiving both character input, while another region of the touchscreen 720 outside the display of the virtual keyboard 740 may be used as a second input device such as, for example, in manners described above such as may employ the use of one or more particular region of a touchscreen in signalling modes.

Additionally or alternatively, another device of the electronic device 700 may be used for mode input.

Figure 7B:
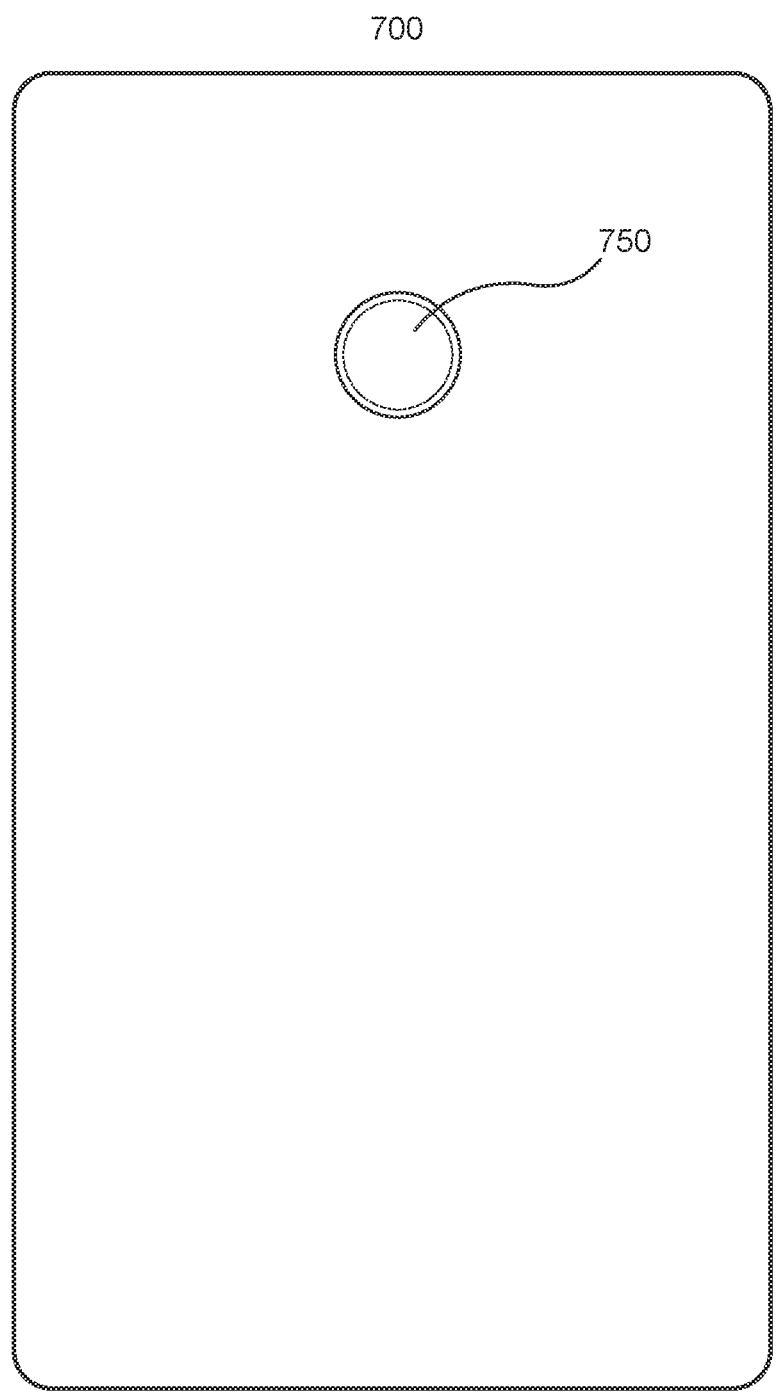
FIG. 7B shows a view of a rear portion of the electronic device of FIG. 7A.

For example, as shown in FIG. 7B, the electronic device 700 may incorporate a fingerprint sensor 750. The fingerprint sensor 750 is touch sensitive and, in particular, is typically employed to detect fingerprints for authentication. In other words, the fingerprint sensor 750 is a touch sensor. As such, the fingerprint sensor 750 may be used for signalling modes or toggling mode changes in manners akin to a touchscreen. For example, a first mode may be signalled by touching the fingerprint sensor 750 and a second mode may be signalled by not touching the fingerprint sensor 750. Alternatively, modes may be toggled by tapping the fingerprint sensor 750.

As illustrated, the fingerprint sensor 750 may be a rear-facing fingerprint sensor. Additionally or alternatively, a fingerprint sensor could, additionally or alternatively, be mounted on the front or side of the electronic device 700. If rear-facing, the fingerprint sensor 750 may advantageously allow mode changes to be signalled more surreptitiously than a front-facing fingerprint sensor. For example, if an observer is watching or recording a user entering their password, the fingerprint sensor 750 may be hidden. Conveniently, therefore, any interaction by a user with the fingerprint sensor 750 may be difficult for an observer to detect or observe.

In some embodiments, it may be permitted to employ more than one input device for signalling modes. For example, it may be that a tap of either the touchscreen 720 or the fingerprint sensor 750 can be used to signal a mode transition. In another example, a tap of one of the touchscreen 720 and the fingerprint sensor 750 may signal a transition into a first mode (if not already in that mode) and a tap of the other may signal a transition into a second mode (if not already in that mode). In yet another example, concurrent interactions with the touchscreen 720 and the fingerprint sensor 750 may be required to signal a mode transition. For example, concurrent taps of both devices may be required to signal a mode transition. In another example, a tap of a first of the touchscreen 720 and the fingerprint sensor 750 may be interpreted as signalling a mode transition if the user is concurrently touching (or not touching) the other of the touchscreen 720 and the fingerprint sensor 750.

Conveniently, requiring the use of multiple input devices to signal between signalling modes may frustrate an observer attempting to capture input.

Notably, the use of input sensors other than a touchscreen in signaling modes is not limited to embodiments employing virtual keyboards. For example, a sensor such as, for example, a touch sensor, may be employed, alone or in combination with another sensor, in embodiments involving a physical keyboard.

Further it is also noted that virtual and physical keyboards are not mutually exclusive. For example, in some embodiments, both a physical and a virtual keyboard may be provided and one or both may be employed for providing character input.

Figure 8:
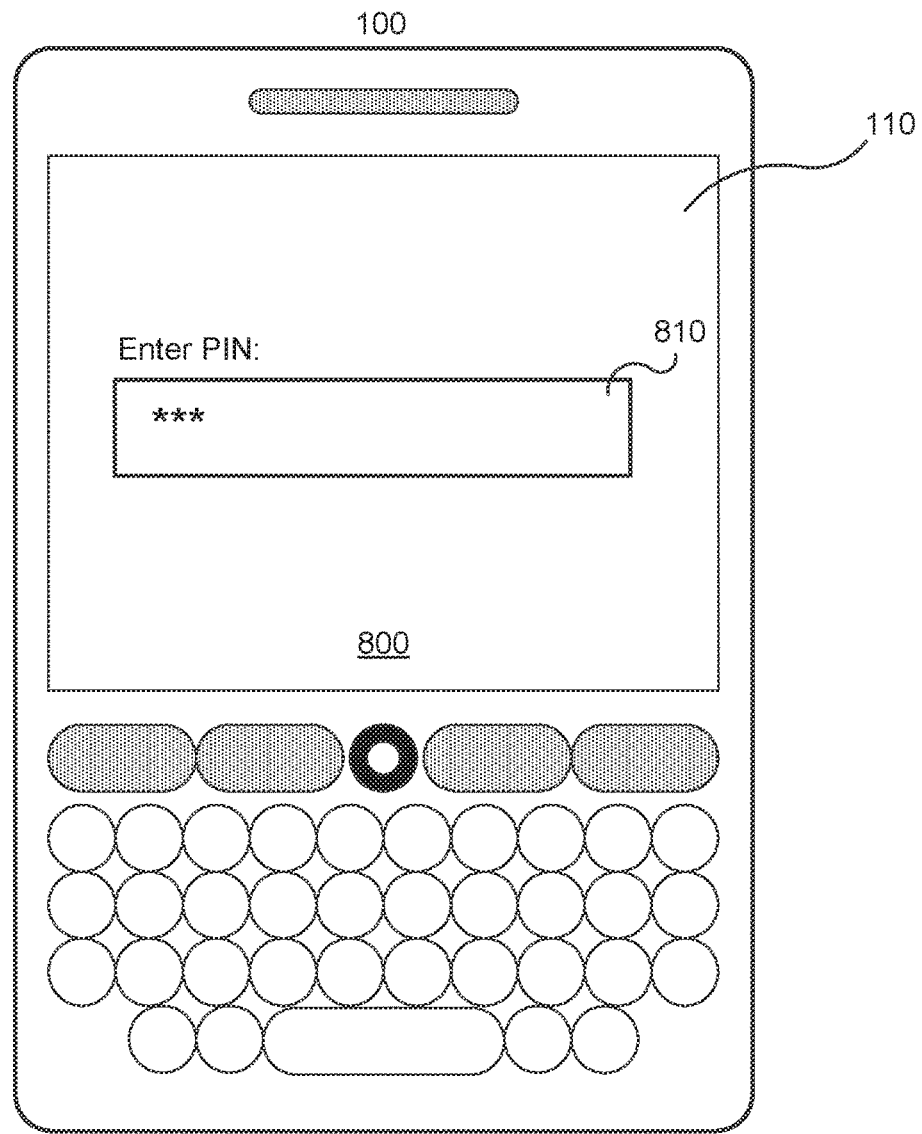
FIG. 8 illustrates a screen display of the electronic device of FIG. 1.

Reference will now be made to FIG. 8 which illustrates a screen display 800 of the electronic device 100.

The screen display 800 includes an input field 810. As displayed in the caption associated with the input field 810, the input field 810 is for input of a password and, in particular, a personal identification number (PIN).

It may not be desirable to display passwords or other confidential data during entry. For example, it may be undesirable to display passwords during entry in locations where a user may be observed as input provided while in such locations may be particularly vulnerable to shoulder surfing. However, in such scenarios it may be nonetheless desirable to provide a user with some feedback that character input has been received. For example, a masked version of a password may be displayed that includes an indication for each input character that has been registered by the electronic device 100. For example, in the illustrated example, three asterisk ("*") characters displayed in the input field 810 may denote that three input characters have been received.

In some embodiments, the length of the input string may be obfuscated by instead displaying a masked indication for each character of the character input, rather than only for the characters of the input string.

Figure 9:
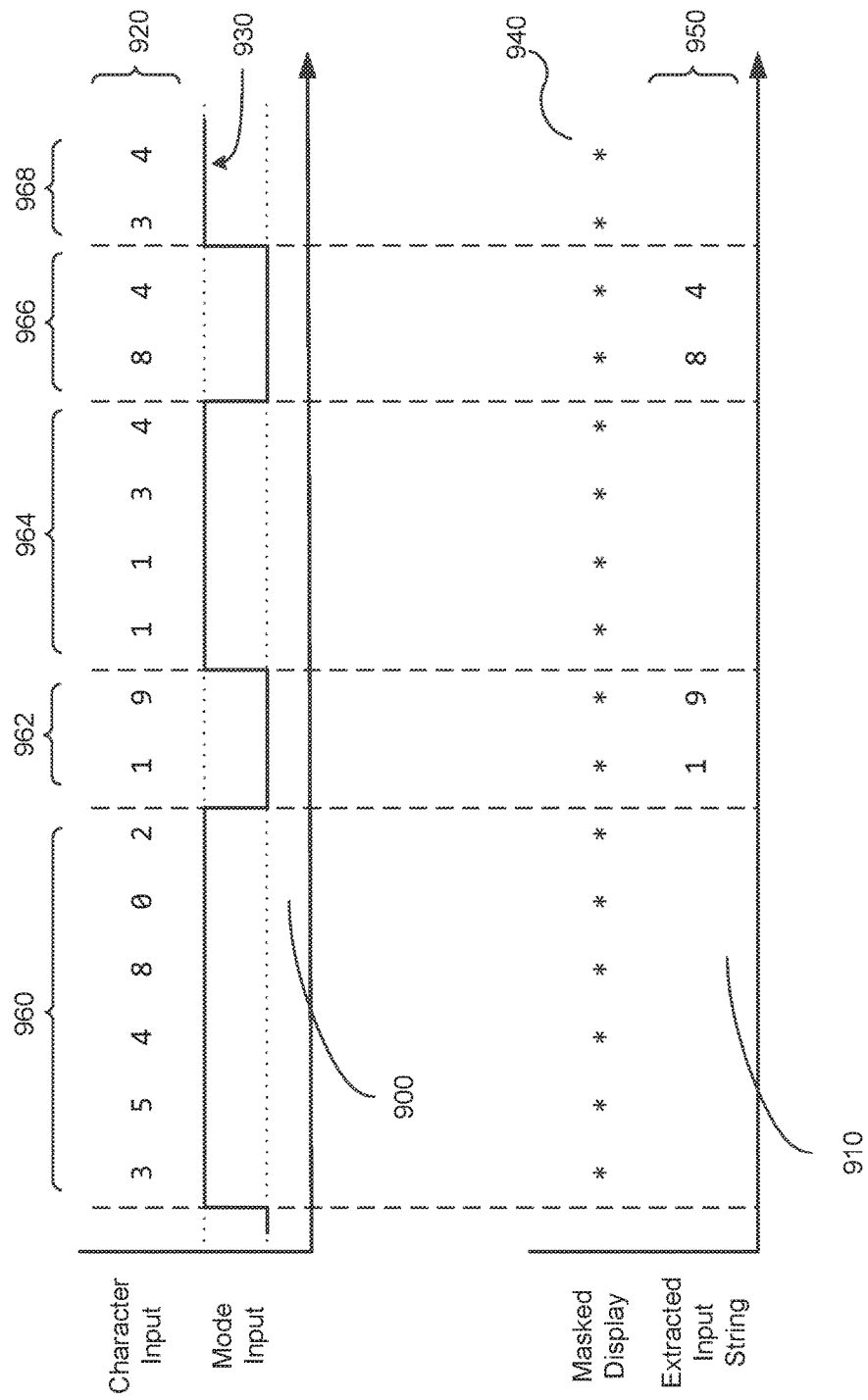
FIG. 9 shows a signal diagram depicting example input and output in accordance with yet another embodiment.

FIG. 9, a signal diagram depicting example input and output, provides an example of how such masking may be performed.

As illustrated, a user may be inputting a PIN number ("1984") in manners in accordance with the present application. In particular, as previously described, a character input 920 may be divided into periods 960, 962, 964, 966, and 968 according to the value of a mode input 930. Notably, in manners already described, an input string 950 may be extracted from the character input 920 based on the various delineated periods. In other words, the input string 950 is determined based on the character input 920 and the mode input 930.

By contrast, in some embodiments where masked input indications are to be displayed based for each input character regardless of mode, when to display masked display indications 940 may be determined based on the character input 920 alone. In particular, as illustrated, a masked input indication may be displayed upon receipt of each input character of the character input 920.

In alternate embodiments, the masked input may further obfuscate how many characters have been received such as, for example, by displaying varying numbers of masked characters for each received character. For example, a random number of indications within a range (such as, for example, 1-3) may be displayed as each character is received. Conveniently, in this way, the user is informed of the fact that a character has been received as they will observe the increment in the number of displayed indications, while the particular number of received characters is further obfuscated.

Masking of input aside, FIG. 9 also illustrates that the input string may be extracted during receipt of the character input 920 and the mode input 930, without a separate extraction operation as was, for example, illustrated in FIG. 5 by the operation 530. It is, however, noted that masked input may be displayed in various embodiments regardless of whether input is extracted during receipt of input or in a separate extraction step.

For example, in some embodiments, received characters may be accrued to a string (e.g. appended to a string that is initially empty) in the first mode but not accrued to the string—i.e. effectively ignored at least as far as accrual to the string—in the second mode. Conveniently, then, at the completion of input, the input string is found in that string. Notably, such embodiments may incur reduced memory overhead as compared to those with a separate extraction step as the former may eliminate the need to store the entire character input while it awaits filtering and, specifically, the need to store any characters received in the second mode.

In another example, in some embodiments, received characters may be passed to an application as input in the first mode but not in the second mode. Put differently, input corresponding to a plurality of characters may be received from a first input device and, concurrently, input may be received from a second input device. As input is received from the second input device, an input mode indication may be determined based on that input, with the input mode indication distinguishing between a first and second input mode. As input is received from the first input device, any portions of that input that are received while the first input mode is indicated may be passed to an application as input.

For example, such an embodiment may be employed to allow input to be passed to a messaging application. Notably, such embodiments may allow input of data to applications in a confidential fashion while allowing the input method to be entirely transparent to the application. For example, it may be that the application is provided with input entered in the first mode as if that was the only input being provided using the first input device. Additionally or alternatively, the input received from the second input device may not be provided to the application or the input may be filtered to exclude portions thereof from which the input mode indication may be determined. For example, where contact with a particular portion of a touchscreen is used to distinguish input modes and the application is receiving events for touches of the touchscreen, events relating to the aforementioned particular portion may be suppressed. In other words, it may be that the input received from the second input device may not be provided to applications if it could be used to distinguish input modes. Advantageously, not providing applications with input that could be used to distinguish input modes may frustrate attempts to formulate keyloggers that can distinguish between actual and dummy input and/or may make it more difficult for such keyloggers to compromise input provided to applications.

In some embodiments, other manners of differentiating input characters from dummy characters may be employed.

For example, in some embodiments rather than a separate character and mode input, whether or not a particular input character should be considered as forming a part of the input string may be based on the manner of input of a particular character In a particular example, pressure may be used in signalling whether a particular character is a character of the input string rather than an additional character. For example, where a virtual keyboard is being used for input via a pressure sensitive touchscreen, a character may be considered as either an input character (i.e. a character of the input string) or an additional character based on whether the input pressure of the corresponding "keypress" on the virtual keyboard (i.e. a touch of the virtual keyboard user interface on the touchscreen) exceeds (or, alternatively, is below) a threshold pressure. For example, characters flowing from keypresses below the threshold may be considered additional or characters ("soft keypresses") and characters flowing from keypresses above the threshold ("hard keypresses") may be considered as forming a portion of the input string, or vice-versa. Conveniently, such hard and soft keypresses may appear the same to an observer.

In another particular example, a physical keyboard that is also touch sensitive may be provided. For example, a physical keyboard with a capacitive upper surface may be provided. Then, characters flowing from keypresses may be considered as forming a part of the input string while mere touching of a key may be treated as an additional character. Conveniently, a touch of a key may be indistinguishable from a keypress (i.e. a depression of the physical key) as far as an observer is concerned.

Notably, it may not be necessary to attribute touches to a particular key as the values of additional characters may be unimportant being as they are discarded. Instead, so long as a touch of the keyboard can be detected, then the fact that the user intended to key an additional character can be detected and appropriate processing can be undertaken. For example, if a touch of the keyboard is detected, appropriate masked indications may be displayed.

In any of the foregoing embodiments, users may be provided with haptic feedback when characters are received. For example, a subtle buzz could be provided whenever a character or keypress is received. In another example, a buzz may only be provided when an input string character or, alternatively, an additional character, is received. In another example, a subtle buzz could be provided whenever a mode change is registered. In other embodiments, different subtle buzzes may be provided for one or more of the foregoing conditions. For example, different patterns or intensity of buzzes could be used to signal different conditions.

In some embodiments, input, whether actual or dummy, may received via input devices other than keyboards. In one example, input may be received, for example, via voice or speech input such as, for example, by way of a microphone of an electronic device. For example, a user may voice or speak input characters or words. One or more methods of signalling may be utilized to allow distinguishing when actual input is being spoken from when dummy input is being spoken. For example, while a user speaks input, one or more of the above described methods for signalling between input modes may be employed. In a specific example, a user may speak input and may signal when dummy input is being spoken by touching a particular portion of the touchscreen.

In another example, input may be received by reading a user's lips such as they mouth words such as, for example, by way of a camera of an electronic device. In some such embodiments, a user might mouth actual input and may vocalize (and thus also mouth) dummy input. A microphone may be used to detect when input is being spoken which may allow actual and dummy input to be distinguished.

In another example, input may be received using sign language or gestures such as, for example, using one or more of American Sign Language (ASL) or British Sign Language (BSL). Such sign language or gesture input may, for example, be provided to an electronic device by way of a recognition of the signs or gestures using a camera. Dummy input may also be signed or gestured and the user may signal when such dummy input is being provided by some suitable method that does not occupy the one or both of their hands being used to provide the sign or gesture input. For example, it may be that dummy input is signalled by a user making a particular motion with their face such as, for example, by opening or closing their mouth, baring their teeth, and/or closing their eyes. In other words, a particular movement may be detected as indicating a particular mode or transition between modes as previously described above. Such signals may, for example, also be recognized by way of a camera. Additionally or alternative, a user may vocalize or refrain from vocalizing while providing gesture or sign input so as to distinguish actual or dummy input. A microphone may be employed in order to capture the vocalization which may allow actual and dummy input to be distinguished.

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer system comprising:
   a processor;
   a first input device coupled to the processor;
   a second input device coupled to the processor; and
   a computer-readable storage medium storing instructions that when executed by the processor adapt the computer system to:
   receive, from the first input device, character input and concurrently receive a separate mode input from the second input device, the mode input dividing the character input into one or more periods of a first input mode and one or more periods of a second input mode;
   form an input string by extracting characters input while in the first input mode from the character input; and
   initiate an action based on the input string.

2. The system of claim 1 wherein the action is initiated based on the input string conditioned on determining that the input string matches a known string.

3. The system of claim 2 wherein the action comprises unlocking the computer system.

4. The system of claim 1 wherein the input string comprises a password.

5. The system of claim 1 wherein the instructions further adapt the computer system to display one or more indications as characters of the character input are received.

6. The system of claim 1 wherein the second input device comprises a sensor and wherein one of the first and second input modes corresponding corresponds to a detection of contact with the sensor and the other of the first and second input modes corresponds to a detection of non-contact with the sensor.

7. The system of claim 6 wherein the sensor comprises a portion of a touchscreen.

8. The system of claim 6 wherein the sensor comprises a fingerprint sensor.

9. The system of claim 1 wherein the first input device comprises a keyboard.

10. The system of claim 1 wherein the first input device comprises a microphone.

11. The system of claim 1 wherein the first input device comprises a camera.

12. The system of claim 1 wherein the first input device comprises a touchscreen and wherein the character input is received via a virtual keyboard displayed on the touchscreen.

13. A computer-implemented method comprising:
   receiving, from a first input device, character input and concurrently receiving a separate mode input from a second input device, the mode input dividing the character input into one or more periods of a first input mode and one or more periods of a second input mode;
   forming an input string by extracting characters input while in the first input mode from the character input; and
   initiating an action based on the input string.

14. The method of claim 13 wherein the action is initiated based on the input string conditioned on determining that the input string matches a known string.

15. The method of claim 14 wherein the action comprises unlocking a device.

16. The method of claim 13 further comprising displaying one or more indications as characters of the character input are received.

17. The method of claim 13 wherein the second input device comprises a sensor and wherein one of the first and second input modes corresponds to a detection of contact with the sensor and the other of the first and second input modes corresponds to a detection of non-contact with the sensor.

18. The method of claim 17 wherein the sensor comprises a portion of a touchscreen.

19. The method of claim 18 wherein the first input device comprises a virtual keyboard displayed on another portion of the touchscreen.

20. A non-transitory computer-readable storage medium storing instructions that when executed by a processor of a computer system adapt the computer system to:
    receive, from a first input device, character input and concurrently receive a separate mode input from a second input device, the mode input dividing the character input into one or more periods of a first input mode and one or more periods of a second input mode;
    form an input string by extracting characters input while in the first input mode from the character input; and
    initiate an action based on the input string.

\* \* \* \* \*